B. REGENBRECHT.
SHOCK ABSORBER.
APPLICATION FILED FEB. 6, 1917.

1,329,678.

Patented Feb. 3, 1920.

Inventor
Bernhard Regenbrecht,
By Jos. H. Hunter,
Attorney

Witness
Chas. L. Griesbauer.

UNITED STATES PATENT OFFICE.

BERNHARD REGENBRECHT, OF ROCKDALE, TEXAS.

SHOCK-ABSORBER.

1,329,678.  Specification of Letters Patent.  Patented Feb. 3, 1920.

Application filed February 6, 1917. Serial No. 146,973.

*To all whom it may concern:*

Be it known that I, BERNHARD REGENBRECHT, citizen of the United States, residing at Rockdale, in the county of Milam and State of Texas, have invented certain new and useful Improvements in Shock-Absorbers, of which the following is a specification, reference being had therein to the accompanying drawing.

The invention relates to improvements in shock absorbers of the friction type particularly adapted for use upon motor vehicles.

It is an object of the invention to provide a shock absorber that retards the return or upward movement of the vehicle body relative to the axle after the depression of the spring, but offers no material resistance to the downward movement of the vehicle body.

A further object of the invention is to produce a shock absorber of this character having coöperating ratchet members with variable frictional retarding means acting upon one of said ratchet members to render the turning thereof relatively hard in view of the amount of friction placed thereon, or vice versa, as the occasion may require, this, of course, depending upon the weight of the automobile body and the size of the springs.

More specifically the invention consists of an absorber suitably attached to the axle of the vehicle and having a flexible portion adapted to be wound upon a drum forming a part of the absorber during the downward movement of the vehicle body. The drum carries a ratchet member coöperating with a complemental ratchet supported by the body of the shock absorber and this ratchet is adapted to be turned by its coöperating ratchet upon the raising of the vehicle body against the resistance of a spring washer adapted to engage a part in contact with the ratchet member to vary the pressure placed upon the said ratchet at will, whereby the resistance offered upon the return of the body is correspondingly varied.

In the drawings, I have illustrated the preferred embodiment of my invention, but it will of course be understood that many changes with regard to size, arrangement and proportion of parts may be made without departing from the spirit thereof.

Figure 1:
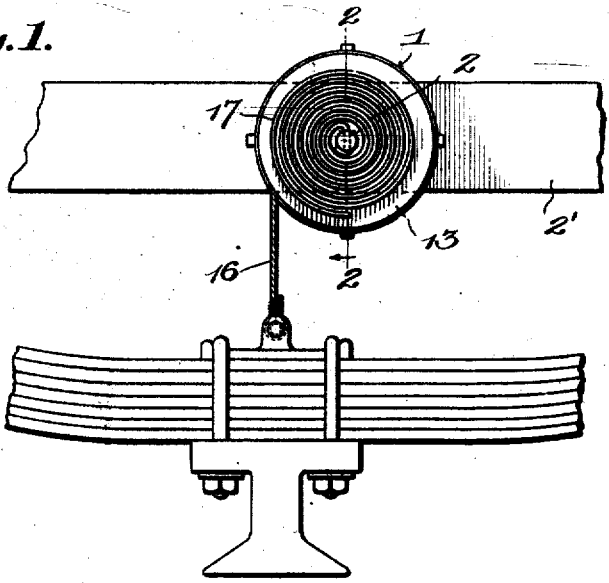
Figure 1 is a side elevation of the device attached to the chassis of a vehicle.
Figure 2:
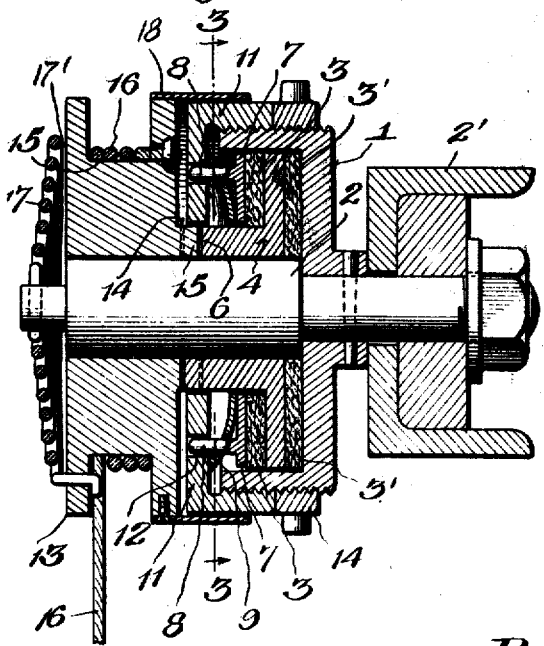
Fig. 2 is a transverse sectional view on the line 2—2 of Fig. 1.
Figure 3:
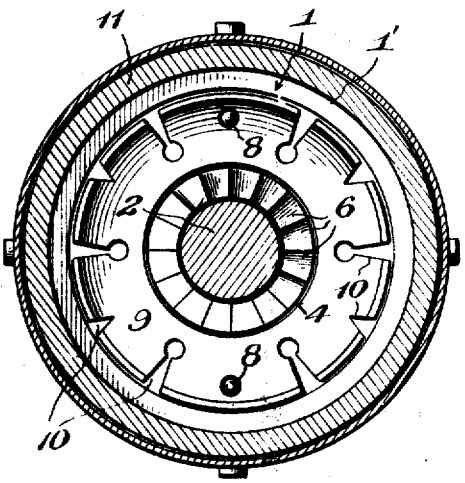
Fig. 3 is a sectional view on the line 3—3 of Fig. 2.

Referring now more particularly to the drawings, wherein like reference characters indicate corresponding parts, the numeral 1 designates a housing which is composed of any suitable material preferably metallic, the same having a central aperture therein to which is rigidly fitted the shaft 2 secured to the frame 2' of the vehicle by passing the same through an aperture in the frame. While this means of attaching the shock absorber to the vehicle is preferable, it will of course be understood that the invention is not limited to an attachment of this specific character as any other suitable means may be employed. The housing 1 has a hollow interior receiving a washer 3' preferably composed of wood or other fibrous material provided with a central opening and fitted around the shaft 2, the offset external threaded flange portion 1' of the body being threaded for a purpose which will hereafter appear. The washer 3' is positioned within the housing adjacent the side thereof for preventing the wearing out of this portion of the housing by the rotary action of the ratchet member 4 which would ordinarily occur if the ratchet were disposed immediately adjacent the side wall of the housing. The ratchet member 4 is provided with a base portion of substantially the same formation as the washer 3' and bears thereagainst, the ratchet also having a forwardly extending neck part provided with ratchet teeth 6 disposed parallel with the shaft 2 and arranged considerably in advance of the base of the ratchet. A washer plate 3 of a formation similar to the washer plate 3' and preferably composed of light material bears against the outer surface of the ratchet member 4 and coöperates with a portion to be later described.

Fitted around the neck portion of the ratchet is a metallic washer 7 of a relatively flat formation and having spaced outstanding pins 8, two being shown for the purpose of illustration, although any number may be used, which pass through apertures in the spring washer plate 9 lying adjacent the washer 8 to prevent a relative movement of these parts. The spring washer plate 9 is of convex formation and to permit the same to be flattened out or compressed a plurality of notches 10 of substantially V-shaped formation are provided which allow for the compressing of the washer and produce a plurality of separated portions along the periphery of the same.

An adjusting means for varying the pressure placed upon the convex washer 10 is employed, the same being designated by the numeral 11 fitting over the widened portion of the shaft 2 and having spaced openings 12 therein receiving the outstanding pins 8 of the flexible metallic washer, this covering and adjusting member being of substantially an angular formation and provided on its interior with threads upon the flange 1' adapted to coöperate with the threads upon the exterior surface of the body 1 so that upon the adjustment of the cover the convex washer is compressed whereby a variable degree of friction is placed upon the base 4, it being understood that a variable adjusting means is employed for applying pressure upon the ratchet member to render the turning thereof very hard or easy, as the occasion may require, this turning, of course, being proportionate to the adjustment of the member 12. To retain the member 11 in its adjusted position a fastening ring 14 is threaded upon the housing 1 and forced into engagement with the collar 12 so as to jam the same. This ring is provided with threads having a pitch disposed opposite to the pitch of the threads on the member 12 to positively lock the same in its adjusted position, but it will be understood that other means capable of performing the desired end may be used.

Mounted upon the widened part of the shaft 2 for a free rotary movement is a portion 13 having an inwardly disposed part 14' provided with peripheral ratchet teeth 15 adapted to coöperate with the ratchet teeth upon the member 4. The portion 13 is also formed with a pulley 15 near its end receiving the flexible cord, chain or the like 16 which is fastened to the pulley and attached to the axle in any convenient manner. When the body is depressed it is, of course, necessary that the flexible cord 16 be wound upon the pulley to keep the same taut, and to maintain the cord in this condition a coil spring 17 is rigidly fastened to the outer end of the shaft 1 and thence coiled so that the inner coils of the spring are disposed inwardly and bear against the surface 17' of the part 13, exerting an inward pressure upon said surface to retain the portion 13 in its proper position. When the body is in its normal position the spring 17 is under tension so that immediately the same drops the spring will unwind and rotate the portion 13 which merely causes the ratchet teeth 15 to travel over the ratchet teeth on the member 4, but the instant the body begins to ascend the complemental ratchet members engage each other and any upward movement of the body is resisted by the ratchet member 4 in view of the friction placed thereon by the convex washer 9. A metallic protecting plate 18 is employed to surround the meeting portions of the part 13 and the collar 11 to prevent dirt, grit and the like from entering between the two coöperating ratchet members, although any other protecting means may be employed if found desirable.

Having thus described the various parts, it is believed the invention may be clearly understood, but the operation may be briefly stated as follows:

When the vehicle body and springs are occupying their normal position as disclosed in Fig. 1, the amount of pressure to be placed upon the ratchet member 4 having been determined, the coil spring 17 is under tension and the cord wrapped around the pulley portion of the absorber is in a taut condition. If the vehicle should strike an obstacle and the body descends the coil spring 17 will then rotate the portion 13 and the pulley thus retaining the connecting cord in a taut condition, but the rotation of the portion 13 does not offer any resistance to the downward movement of the body, as it is not this movement which is injurious to the spring and causes a severe shaking and jarring of the occupants. The serious difficulty to overcome is to prevent a too rapid return or upward movement of the body after the depression of the spring and the instant the body begins to rise the coöperating ratchet teeth are substantially locked, a continued upward movement causing the ratchet member 4 to be turned against the frictional resistance placed thereon by the convex metallic washer 9 so as to materially check the upward movement of the vehicle body.

Having thus described the invention, what I claim is:

1. A shock absorber comprising a casing, a shaft passing therethrough, a washer on said casing, a ratchet member adjacent said washer, a curved resilient retarding washer operatively associated with said ratchet member, adjustable means for applying pressure upon said washer, a part rotatably mounted on said shaft adjacent the casing and having a ratchet coöperating with the first mentioned ratchet, and a flexible operating member carried by said part, the said last mentioned part carrying the flexible operating member when rotated in one direction exerting no influence upon the first mentioned ratchet, but when moved in an opposite direction adapted to turn the said first mentioned ratchet against the friction placed thereon by the spring washer.

2. A shock absorber comprising a casing having an externally threaded portion, a shaft passing therethrough, a ratchet member within the casing, a resilient ratchet retarding member operatively associated with the ratchet, adjustable means for applying pressure upon said retarding member comprising a cover having a threaded portion coöperating with the threaded portion of the casing, a part rotatably mounted on said shaft adjacent the casing, a ratchet carried by said part and coöperating with the first mentioned ratchet, and means attachable to the vehicle for rotating said part.

3. A shock absorber comprising a casing having an externally threaded portion, a shaft passing therethrough, a ratchet member within the casing, a resilient retarding member, adjustable means for applying pressure upon said retarding member comprising a cover having a threaded portion coöperating with the threaded portion of the casing, a part rotatably mounted on said shaft adjacent the casing, a ratchet carried by said part and coöperating with the first mentioned ratchet, and means attachable to the vehicle for rotating said part, said means comprising a flexible operating member.

4. A shock absorber including coöperating members adapted to move together in one direction, one of said members moving relative to the other when moved in an opposite direction, a curved resilient member operatively associated with one of said first mentioned members for retarding the movement thereof, and means for adjusting the tension of said resilient member, said resilient member being of circular formation and having a plurality of radial slots therein.

5. A shock absorber comprising a ratchet member, a bowed disk resilient retarding element carried by the ratchet member, an adjustable element engaging the outer edge of said retarding member and carried by the ratchet member, and a complemental ratchet member coöperating with said first mentioned ratchet member.

6. A shock absorber comprising a ratchet member, a bowed disk resilient retarding element carried by the ratchet member, an adjustable element engaging the outer edge of said retarding member and carried by the ratchet member, a complemental ratchet member coöperating with said first mentioned ratchet member, and a flexible element connected with the last mentioned ratchet.

7. A shock absorber including coöperating members adapted to move together in one direction, and one member moved relative to the other when force is applied in an opposite direction, a resilient member operatively associated with one of said first mentioned members, means for adjusting the tension of said resilient member comprising a part engaging the outer edge of the resilient member and having a threaded connection with one of the coöperating members, substantially as described.

8. A shock absorber including coöperating members adapted to move together in one direction, and one member moved relative to the other when force is applied in an opposite direction, a resilient member operatively associated with one of said first mentioned members, means for adjusting the tension of said resilient member comprising a part engaging the outer edge of the resilient member and having a threaded connection with one of the coöperating members, said resilient member having a plurality of radial substantially V-shaped slots therein.

In testimony whereof I affix my signature in presence of two witnesses.

BERNHARD REGENBRECHT.

Witnesses:
E. A. CAMP,
ELIZABETH CAMP.